United States Patent
Morales (10) Patent No.: US 11,089,174 B1
(45) Date of Patent: *Aug. 10, 2021

(54) INTELLIGENT CONTROL OF MEDIA UNIT OUTPUT OF A PRINTER

(71) Applicant: KYOCERA DOCUMENT SOLUTIONS INC., Osaka (JP)

(72) Inventor: Javier A. Morales, Rochester, NY (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/817,534

(22) Filed: Mar. 12, 2020

(51) Int. Cl.
*H04N 1/00* (2006.01)
*G06F 3/12* (2006.01)

(52) U.S. Cl.
CPC ....... *H04N 1/00633* (2013.01); *G06F 3/1204* (2013.01); *G06F 3/126* (2013.01); *G06F 3/1254* (2013.01); *H04N 1/00708* (2013.01)

(58) Field of Classification Search
CPC ....... H04N 1/00633; H04N 2201/0082; H04N 1/00002; H04N 1/00015; H04N 1/00031; H04N 1/0005; H04N 1/00063; H04N 1/00082; H04N 1/0032; H04N 1/00639; H04N 1/00917; H04N 1/00954; H04N 1/32106; H04N 2201/0094; H04N 2201/0098; H04N 2201/3215; H04N 2201/3216; H04N 2201/3219; H04N 2201/3221; H04N 2201/3222; H04N 2201/3223; H04N 1/00384; H04N 1/00493; H04N 1/00567; H04N 1/00641; H04N 1/00663; H04N 1/00681; H04N 1/00697; H04N 1/00771; H04N 1/00782; H04N 1/6027; H04N 7/0117; H04N 7/147; H04N 1/00408; H04N 1/00413; H04N 1/00424; H04N 1/00466; H04N 1/00482; H04N 1/00588; H04N 1/00602; H04N 1/00694; H04N 1/00745; H04N 1/32122; H04N 1/32502; H04N 1/32512; H04N 2201/0039; H04N 2201/0079; H04N 2201/3205;

(Continued)

(56) References Cited

U.S. PATENT DOCUMENTS

| | | | | |
|---|---|---|---|---|
| 5,308,058 A | * | 5/1994 | Mandel | B65H 39/11 271/289 |
| 5,551,686 A | * | 9/1996 | Sanchez | B65H 39/11 270/58.18 |

(Continued)

*Primary Examiner* — Negussie Worku
(74) *Attorney, Agent, or Firm* — GrowIP Law Group LLC (57) ABSTRACT

An example method performed by a computing device may involve receiving print job data representing a print job to be carried out by a printer to produce at least one copy of a media product. The method may also involve using a condition set to select, from a plurality of bins of the printer each configured for storing media units output by the printer, a set of one or more bins for use in carrying out the print job. The condition set may include a first condition that the set of bins includes a particular bin having a remaining media unit capacity suitable for storing a total number of media units required to complete the print job. The method may also involve in response to using the condition set to select the set of bins, controlling the printer to carry out the print job using the set of bins.

20 Claims, 3 Drawing Sheets

(58) Field of Classification Search
CPC .... H04N 2201/3242; H04N 2201/3276; G06F 3/013; G06F 3/1205; G06F 3/1256; G06F 3/1288; G06F 15/76; G06F 16/24568
USPC ......................................................... 358/498
See application file for complete search history.

(56) References Cited

U.S. PATENT DOCUMENTS

| | | | |
|---|---|---|---|
| 5,603,492 A * | 2/1997 | Mandel | B65H 39/10 270/58.09 |
| 5,777,882 A * | 7/1998 | Salgado | B65H 39/10 270/52.03 |
| 6,125,242 A | 9/2000 | Yamada | |
| 6,227,643 B1 * | 5/2001 | Purcell | B41J 2/01 347/14 |
| 6,494,453 B1 | 12/2002 | Yamada et al. | |
| 6,714,747 B2 | 3/2004 | Asai | |
| 7,038,795 B2 | 5/2006 | Kaneko et al. | |
| 7,190,910 B2 | 3/2007 | Matsunaga | |
| 7,509,067 B2 | 3/2009 | Katahira | |
| 8,107,115 B2 * | 1/2012 | Morales | G06F 3/1288 358/1.16 |
| 8,167,308 B2 | 5/2012 | Tanaka | |
| 8,565,635 B2 | 10/2013 | Yamada | |
| 8,823,970 B2 * | 9/2014 | Morales | G06F 3/1206 358/1.15 |
| 10,517,942 B2 * | 12/2019 | Berman | A61K 39/12 |
| 10,831,418 B1 * | 11/2020 | Morales | G06F 3/1244 |
| 10,931,842 B1 * | 2/2021 | Morales | H04N 1/00708 |
| 2010/0301623 A1 * | 12/2010 | Dupras | B66C 1/42 294/86.4 |
| 2015/0055172 A1 * | 2/2015 | Iida | H04N 1/0083 358/1.15 |
| 2019/0146724 A1 * | 5/2019 | Itoh | G06F 3/1297 358/1.13 |
| 2019/0297211 A1 * | 9/2019 | Tanaka | G06F 3/1205 |
| 2020/0314268 A1 * | 10/2020 | Kimura | H04N 1/00708 |

* cited by examiner

INTELLIGENT CONTROL OF MEDIA UNIT OUTPUT OF A PRINTER

BACKGROUND

Automation of printing operations must take numerous factors into account and it can thus often be difficult to manage automated printing operations. For example, existing printers with multiple trays and output bins often have functionality to automatically select which trays should supply media units (e.g., paper) for printing and/or which output bins should be used to store the output (e.g., a media product, such as a multi-page document) of the print job.

However, the automation functionality of such existing printers is often centered around only a subset of attributes of the print job, such as physical production requirements. For instance, existing automation systems might select trays and/or bins containing paper whose dimensions match the dimensions specified as part of the current print job, but ignore other printing attributes. Additionally or alternatively, existing automation systems might select trays and/or bins based on the respective status of each such tray and/or bin, and/or might select trays and/or bins based on predefined selection policies that take a limited amount of printing and selection criteria into account. As a result, such existing automation systems can be error-prone in directing printers to carry out print jobs. For example, the printer might produce a media product made up of incorrect paper (e.g., some pages of one size or color, some pages of a different size or color) and/or might split up the media product between two or more bins when the media product was meant to be kept together and output into a single bin. As another example, less-than-optimized automated tray selection can lead to one or more trays becoming empty (or one or more bins becoming full) and having to be reloaded (or emptied) in order to complete the print job. These and other errors in the automation and printing process can make printing time consuming and can require more human intervention than desired to resolve such errors (e.g., by having users load new paper in a tray to avoid the printer switching to unacceptable paper).

SUMMARY

In one aspect, a method for controlling feeding of media units in a printer is provided. The method involves receiving, by a computing device configured to control operation of the printer, print job data representing a print job to be carried out by the printer to produce at least one copy of a media product, where the printer includes a plurality of trays that are each configured for supplying media units for print jobs carried out by the printer. The method further involves using, by the computing device, a condition set to select, from the plurality of trays, a set of one or more trays for use in carrying out the print job. Using the condition set to select the set of trays involves determining whether the set of trays satisfies at least one condition of the condition set and, in response to determining that the set of trays satisfies at least one condition of the condition set, selecting the set of trays for use in carrying out the print job, where the condition set comprises a first condition that the set of trays includes a particular tray that is holding enough media units for supplying a total number of media units required to complete the print job, the total number of media units being defined as a number of media units required per copy of the media product multiplied by a number of copies of the media product requested as part of the print job. The method further involves, in response to using the condition set to select the set of trays, controlling, by the computing device, the printer to carry out the print job using the set of trays.

In another aspect, a system is provided. The system includes a printer and a computing device, where the printer includes a plurality of trays that are each configured for supplying media units for print jobs carried out by the printer. The computing device is configured to receive print job data representing a print job to be carried out by the printer to produce at least one copy of a media product, where the printer includes a plurality of trays that are each configured for supplying media units for print jobs carried out by the printer. The computing device is also configured to use a condition set to select, from the plurality of trays, a set of one or more trays for use in carrying out the print job. Using the condition set to select the set of trays involves determining whether the set of trays satisfies at least one condition of the condition set and, in response to determining that the set of trays satisfies at least one condition of the condition set, selecting the set of trays for use in carrying out the print job, where the condition set comprises a first condition that the set of trays includes a particular tray that is holding enough media units for supplying a total number of media units required to complete the print job, the total number of media units being defined as a number of media units required per copy of the media product multiplied by a number of copies of the media product requested as part of the print job. The computing device is also configured to, in response to using the condition set to select the set of trays, control the printer to carry out the print job using the set of trays.

In another aspect, an article of manufacture is provided. The article of manufacture includes non-transitory data storage storing at least computer-readable instructions that, when executed by one or more processors of a computing device, cause the computing device to perform operations. The operations include: receiving print job data representing a print job to be carried out by a printer to produce at least one copy of a media product, where the printer includes a plurality of trays that are each configured for supplying media units for print jobs carried out by the printer; using a condition set to select, from the plurality of trays, a set of one or more trays for use in carrying out the print job, wherein using the condition set to select the set of trays comprises determining whether the set of trays satisfies at least one condition of the condition set and, in response to determining that the set of trays satisfies at least one condition of the condition set, selecting the set of trays for use in carrying out the print job, where the condition set comprises a first condition that the set of trays includes a particular tray that is holding enough media units for supplying a total number of media units required to complete the print job, the total number of media units being defined as a number of media units required per copy of the media product multiplied by a number of copies of the media product requested as part of the print job; and in response to using the condition set to select the set of trays, controlling the printer to carry out the print job using the set of trays.

In yet another aspect, a method for controlling media unit output of a printer is provided. The method involves receiving, by a computing device configured to control operation of the printer, print job data representing a print job to be carried out by the printer to produce at least one copy of a media product, where the printer includes a plurality of bins that are each configured for storing media units output by the printer in accordance with print jobs carried out by the printer. The method also involves using, by the computing device, a condition set to select, from the plurality of bins, a set of one or more bins for use in carrying out the print job. Using the condition set to select the set of bins involves determining whether the set of bins satisfies at least one condition of the condition set and, in response to determining that the set of bins satisfies at least one condition of the condition set, selecting the set of bins for use in carrying out the print job, where the condition set comprises a first condition that the set of bins includes a particular bin having a remaining media unit capacity suitable for storing a total number of media units required to complete the print job, the total number of media units being defined as a number of media units required per copy of the media product multiplied by a number of copies of the media product requested as part of the print job. The method also involves, in response to using the condition set to select the set of bins, controlling, by the computing device, the printer to carry out the print job and store media units of the at least one copy of the media product in the set of bins.

In yet another aspect, a system is provided. The system includes a printer and a computing device, where the printer includes a plurality of bins that are each configured for storing media units output by the printer in accordance with print jobs carried out by the printer. The computing device is configured to receive a print job data representing a print job to be carried out by the printer to produce at least one copy of a media product. The computing device is also configured to use a condition set to select, from the plurality of bins, a set of one or more bins for use in carrying out the print job. Using the condition set to select the set of bins involves determining whether the set of bins satisfies at least one condition of the condition set and, in response to determining that the set of bins satisfies at least one condition of the condition set, selecting the set of bins for use in carrying out the print job, where the condition set comprises a first condition that the set of bins includes a particular bin having a remaining media unit capacity suitable for storing a total number of media units required to complete the print job, the total number of media units being defined as a number of media units required per copy of the media product multiplied by a number of copies of the media product requested as part of the print job. The computing device is also configured to, in response to using the condition set to select the set of bins, control the printer to carry out the print job and store media units of the at least one copy of the media product in the set of bins.

In yet another aspect, an article of manufacture is provided. The article of manufacture includes non-transitory data storage storing at least computer-readable instructions that, when executed by one or more processors of a computing device, cause the computing device to perform operations. The operations include: receiving print job data representing a print job to be carried out by a printer to produce at least one copy of a media product, where the printer includes a plurality of bins that are each configured for storing media units output by the printer in accordance with print jobs carried out by the printer; using a condition set to select, from the plurality of bins, a set of one or more bins for use in carrying out the print job, where using the condition set to select the set of bins comprises determining whether the set of bins satisfies at least one condition of the condition set and, in response to determining that the set of bins satisfies at least one condition of the condition set, selecting the set of bins for use in carrying out the print job, where the condition set comprises a first condition that the set of bins includes a particular bin having a remaining media unit capacity suitable for storing a total number of media units required to complete the print job, the total number of media units being defined as a number of media units required per copy of the media product multiplied by a number of copies of the media product requested as part of the print job; and in response to using the condition set to select the set of bins, controlling the printer to carry out the print job and store media units of the at least one copy of the media product in the set of bins.

Other aspects, embodiments, and implementations will become apparent to those of ordinary skill in the art by reading the following detailed description, with reference where appropriate to the accompanying drawings.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

The present disclosure refers to printer production of "media products" using "media units." Embodiments of the present disclosure will be described herein primarily in the context of printing media products that take the form of paper documents, where sheets of paper are "media units." It should be understood, however, that the present disclosure can be applicable to the printing of other types of media, such as three-dimensional (3D) printing (in which case "media units" may be filament selections used for 3D printing). Other examples are possible as well.

Furthermore, the embodiments of the present disclosure will be described with reference to "trays" and "bins" of a printer, where the trays are each configured for supplying media units for print jobs (also referred to herein as "jobs," for brevity) carried out by the printer and the bins are each configured for storing media units output by the printer in accordance with print jobs carried out by the printer. However, it should be understood that, physical components of a printer other than trays can be similarly configured and used to supply media units for print jobs, and physical components of the printer other than bins can be similarly configured and used to store media units output by the printer.

As discussed above, errors in existing automation systems decision making can result in various print job errors and inefficiencies in printing media products. These issues can be especially problematic and difficult to manage when managing the printing operations across numerous (e.g., hundreds of) printers, when numerous print jobs are being performed in a short time span, and/or when print jobs involve numerous (e.g., hundreds of) copies of at least one media product.

In practice, many of these issues exist as a result of automation systems considering only certain media unit attributes for a print job. For example, printer trays and bins might not be selected based on whether they can supply (for trays) or hold (for bins) the entire print job. As another example, when existing automation systems attempt to control switching between trays during printing, such systems might not consider whether papers that match print job requirements will have a substantially different appearance. For instance, a first portion of the print job can be printed with one color of paper from a first tray, the job requirements might not specify paper color, and thus, in switching to another tray that holds paper with attributes that meet the specified job requirements (e.g., paper dimensions), a different color paper might be used to finish the remaining portion of the print job, thus producing a document having paper with the correct dimensions, but undesirably having two different color papers. As yet another example, when existing automation systems attempt to control switching between bins during printing, such systems might consider stacked sheets, which may cause content within the job to be split up when that content should be kept together. Other examples are possible as well.

To address these and other issues, described herein are techniques that relate to intelligent control of media unit feeding (e.g., from trays) and output (e.g., to bins), particularly an intelligent control system (also referred to herein as "the disclosed system," or "the system," for brevity) that takes into account more factors than existing systems as well as factors that are not typically considered by existing systems. As a result, the disclosed system can improve printing efficiency by reducing human intervention and reducing or eliminating errors in produced media products. Particularly, upon receipt of print job data representing a print job to be carried out, a computing device of the disclosed system (also referred to herein as "the computing device," for brevity) can use a condition set to select a set of trays (which can include one or more of the printer's trays) for use in carrying out the print job and/or can use a condition set to select a set of one or more bins of the printer for use in carrying out the print job. The set of trays can include one or more of the printer's trays, and the set of bins can include one or more of the printer's bins. The condition set used to select tray(s) will hereinafter be referred to interchangeably with "tray condition set," and the condition set used to select bin(s) will hereinafter be referred to interchangeably with "bin condition set."

If the computing device determines that the set of trays satisfies at least one condition of the tray condition set, the computing device selects the set of trays for use in carrying out the print job. Similarly, if the computing device determines that the set of bins satisfies at least one condition of the bin condition set, the computing device selects the set of bins for use in carrying out the print job. An example first condition that can be included in the tray condition set is a condition that the set of trays includes a particular tray that is holding enough media units for supplying a total number of media units required to complete the print job. The total number of media units is defined as a number of media units required per copy of the media product multiplied by a number of copies of the media product requested as part of the print job. An example first condition that can be included in the bin condition set is a condition that the set of bins includes a particular bin having a remaining media unit capacity suitable for storing a total number of media units required to complete the print job. The total number of media units is defined as a number of media units required per copy of the media product multiplied by a number of copies of the media product requested as part of the print job. Other conditions are possible and will be described in more detail herein. The disclosed systems and methods are advantageously proactive in helping determine whether all required resources for a print job (e.g., trays, bins, and media units held by or output to) are available before such resources are used.

Furthermore, as will be described in more detail later herein, many of the operations of the disclosed system can be performed proactively with respect to a queue of print jobs in order to reduce human intervention and reduce errors. For example, the disclosed system can look ahead at upcoming print jobs and determine which of the printer's trays/bins are available and suitable for use in completing two or more of the next print jobs in the queue. These proactive operations can also involve notifying the user farther in advance so that the user has enough time to reload trays and/or empty bins to a degree that would allow multiple queued print jobs to be performed. These proactive operations can also involve reshuffling the print jobs in the queue based on various factors, such as the quantity of media units for each of the upcoming jobs or the media unit dimensions required for each of the upcoming jobs.

Typically, when a job is queued for printing, existing systems configured to control printer operation select trays based at least in part on a determination of which trays are available for use (e.g., which trays have paper in them). Similarly, existing systems select bins based at least in part on a determination of which bins are available for use (e.g., which bins are empty). One or more of the embodiments described herein can make these determinations as well, such as a prerequisite for a tray/bin before the tray/bin is considered for selection for use in carrying out a job.

Implementations described below are for purposes of example. The implementations described below, as well as other implementations, may provide other improvements as well.

II. Example Printing Control System and Computing Device

Figure 1:
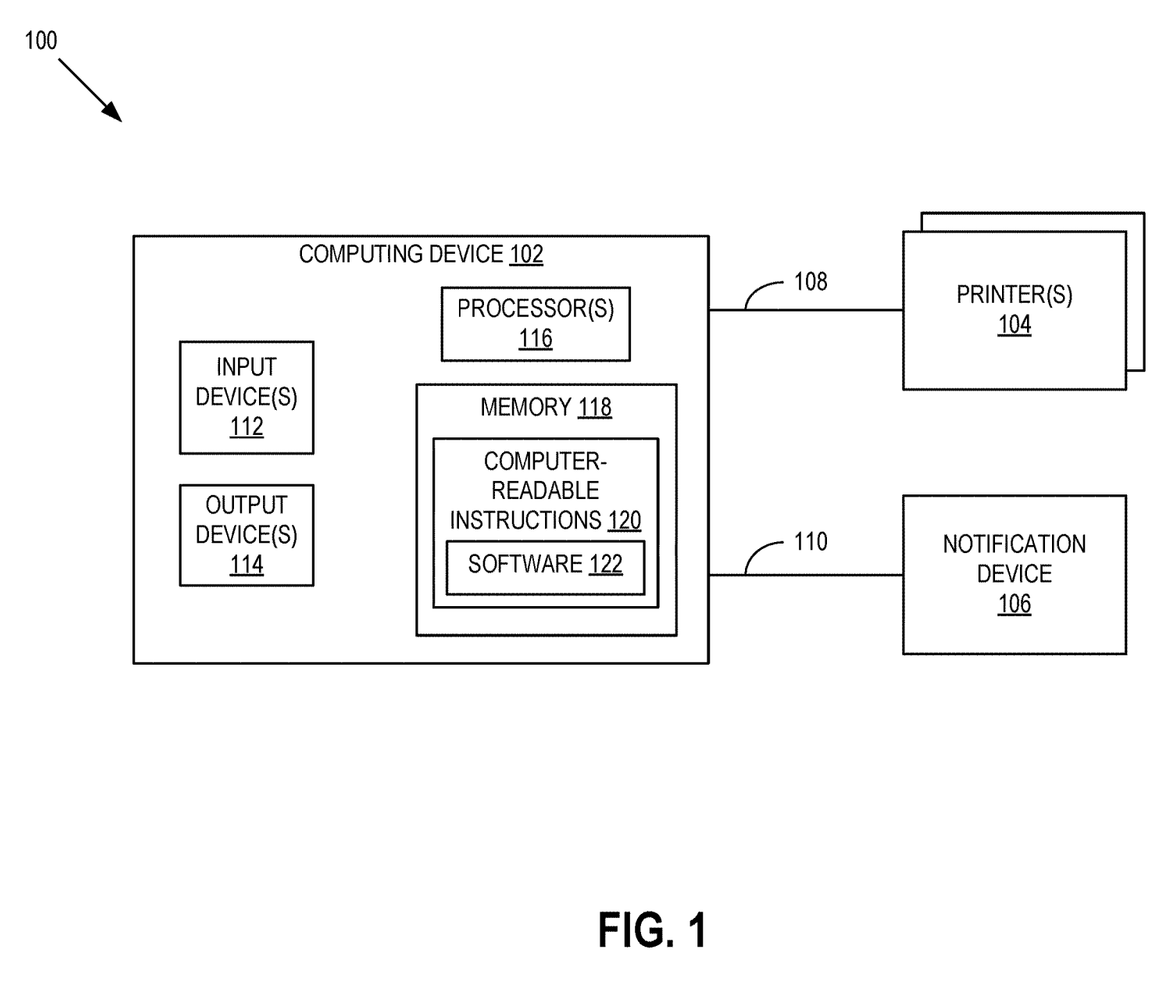
FIG. 1 is a schematic block diagram illustrating a system for intelligent control of printing operations, in accordance with at least some example embodiments.

Referring now to the figures, FIG. 1 is a schematic block diagram illustrating a system 100 for intelligent control of printing operations, in accordance with at least some example embodiments. As shown, the system 100 includes a computing device 102 and one or more printers 104. In some embodiments, the computing device 102 can be configured to perform at least part of the herein-described procedures and techniques for controlling feeding and output of media units for printing. As further shown, the system 100 includes a notification device 106. The computing device 102 is connected to the printer(s) 104 by way of communication link 108 and the computing device 102 is connected to the notification device 106 by way of communication link 110. Either communication link 108, 110 can be a wired (e.g., Ethernet or other electronics) or wireless connection (e.g., Bluetooth®, ZigBee®, Wi-Fi®, WiMAX™). For example, the computing device 102 can communicate with the printer(s) 104 over a local or wide area network.

The computing device 102 can take the form of a desktop computer, a server, a laptop computer, a smartphone, a wearable computing device, a tablet computer, and/or other type of computing device. The computing device can include one or more input devices 112, one or more output devices 114, one or more processors 116, and memory 118. In other examples, the computing device 102 can include more or fewer components in other arrangements.

The input device(s) 112 can include user input devices, network input devices, sensors, and/or other types of input devices. For example, the input device(s) 102 can include user input devices such as a touch screen, a keyboard, a keypad, a computer mouse, a track ball, a joystick, a camera, a voice recognition module, and/or other similar devices. Network input devices can facilitate communication over the communication links 108, 110 and can include wired network receivers and/or transceivers, such as an Ethernet® transceiver, a Universal Serial Bus (USB) transceiver, or similar transceiver configurable to communicate via a twisted pair wire, a coaxial cable, a fiber-optic link, or a similar physical connection to a wireline network, and/or can include wireless network receivers and/or transceivers, such as a Bluetooth® transceiver, a ZigBee® transceiver, a Wi-Fi® transceiver, a WiMAX™ transceiver, a wireless wide-area network (WWAN) transceiver and/or other similar types of wireless transceivers configurable to communicate via a wireless network.

The output device(s) 114 can include user display devices, audible output devices, network output devices, and/or other types of output devices. User display devices can include one or more printing components, liquid crystal displays (LCD), light emitting diodes (LEDs), lasers, displays using digital light processing (DLP) technology, cathode ray tubes (CRT), light bulbs, and/or other similar devices. Audible output devices can include a speaker, speaker jack, audio output port, audio output device, headphones, earphones, and/or other similar devices. Network output devices can facilitate communication over the communication links 108, 110 and can include wired network receivers and/or transceivers, such as an Ethernet® transceiver, a Universal Serial Bus (USB) transceiver, or similar transceiver configurable to communicate via a twisted pair wire, a coaxial cable, a fiber-optic link, or a similar physical connection to a wireline network, and/or can include wireless network receivers and/or transceivers, such as a Bluetooth® transceiver, a ZigBee® transceiver, a Wi-Fi® transceiver, a WiMAX™ transceiver, a wireless wide-area network (WWAN) transceiver and/or other similar types of wireless transceivers configurable to communicate via a wireless network. Other types of output devices can include, but are not limited to, vibration devices, haptic feedback devices, and non-visible light emission devices; e.g., devices that emit infra-red or ultra-violet light. Other output devices 104 are possible as well.

The processor(s) 116 can include one or more general purpose processors, central processing units (CPUs), CPU cores, and/or one or more special purpose processors (e.g., graphics processing units (GPUs), digital signal processors (DSPs), field programmable gated arrays (FPGAs), application specific integrated circuits (ASICs), etc.). The processor(s) 116 can be configured to execute computer-readable instructions 120 that are contained in memory 118 and/or other instructions as described herein.

The memory 118 can include one or more computer-readable storage media configured to store data and/or instructions that can be read and/or accessed by at least one of the processor(s) 116. The one or more computer-readable storage media can include one or more volatile and/or non-volatile storage components, such as optical, magnetic, organic or other memory or disc storage, which can be integrated in whole or in part with at least one of processors 106. The computer-readable storage media can include one or more components that store data for short periods of time like register memories, processor caches, and/or random access memories (RAM). The computer-readable storage media can include non-transitory computer readable media that stores program code and/or data for longer periods of time, such as secondary or persistent long term storage; for example, read only memory (ROM), optical or magnetic disks, compact-disc read only memory (CD-ROM). In some embodiments, memory 108 can be implemented using a single physical device (e.g., one optical, magnetic, organic or other memory or disk storage unit), while in other embodiments, memory 108 can be implemented using two or more physical devices.

In particular, the memory 118 can store computer-readable instructions 120 that, when executed by one or more of processor(s) 116, can cause a computing device (e.g., computing device 102) to perform functions, such as but not limited to, functions related to herein-described procedures, techniques, devices, networks, methods, features, and/or scenarios. In some embodiments, computer-readable instructions 120 can include at least instructions for printing operation software 122. Printing operation software 122, when executed by the processor(s) 116 of the computing device 102, provides instructions to the computing device 102 to carry out part or all of the methods described herein, and/or provide some or all of the functionality described with respect to example scenarios. In some embodiments, the computer-readable instructions 120 and/or the printing operation software 122 can include at least instructions to carry out at least part of the herein-described functionality of a printer, a computing device, and/or other device.

The printer(s) 104 can include components configured to perform one or more operations, such as scan, print, copy, e-mail, account for, communicate and/or otherwise process documents and/or files that are originally available either on paper or electronically. For example, one or more of the printer(s) 104 can include a plurality of trays that are each configured for supplying (also referred to herein as "feeding") media units for print jobs carried out by the printer and can also include a plurality of bins that are each configured for storing media units output by the printer in accordance with print jobs carried out by the printer. As another example, one or more of the printer(s) 104 can include a keyboard, display device configured to provide a graphical user interface (GUI), and/or other user interface device with which a user can interact to view and input information associated with the printer(s) 104 and/or print jobs carried out by the printer. As another example, one or more of the printer(s) 104 can include scanning components for creating electronic copies of original paper documents and/or for generating electronic data via optical character recognition (OCR) or other techniques from the original paper documents. As noted above, the printer(s) 104 and any other printer described herein can take other forms and can be configured to produce other types of media, such as 3D-printed products. In some embodiments, the printer(s) 104 can perform other tasks and/or other processing as well. As such, the printer(s) 104 can include products from various manufacturers with variations in color, speed, computing power, functionality, network connectivity, and/or other features.

The notification device 106 can take the form of any computing device or components thereof that is/are configured to provide audio and/or visual notifications to a user. For example, the notification device 106 can take the form of a laptop computer, smartphone, or user interface system thereof (e.g., a graphical user interface (GUI) and/or speaker). In some embodiments, the notification device 106 can be configured to receive, from the computing device 102 or an intermediate device between the computing device 102 and the notification device 106, an instruction that, upon receipt by the notification device 106, causes the notification device 106 to display a notification, such as a notification indicating that a tray must be loaded with additional media units for a printer to complete a job and/or a notification indicating that a bin must be unloaded, and perhaps additionally indicating instructions as to how or when the tray/bin should be loaded/unloaded. In some embodiments, the computing device 102 can include the notification device 106. In other embodiments, one of the printer(s) 104 can include the notification device 106 (e.g., the printer's display device, which displays a GUI, can operate as the notification device). Other examples of the notification device 106 are possible as well.

In some embodiments, one or more additional computing devices, e.g., one or more servers, nodes, and/or other computing devices, can be connected to the computing device 102, the printer(s) 104, and/or the notification device 106 to perform additional functions.

III. Example Operations for Controlling Feeding of Media Units

Figure 2:
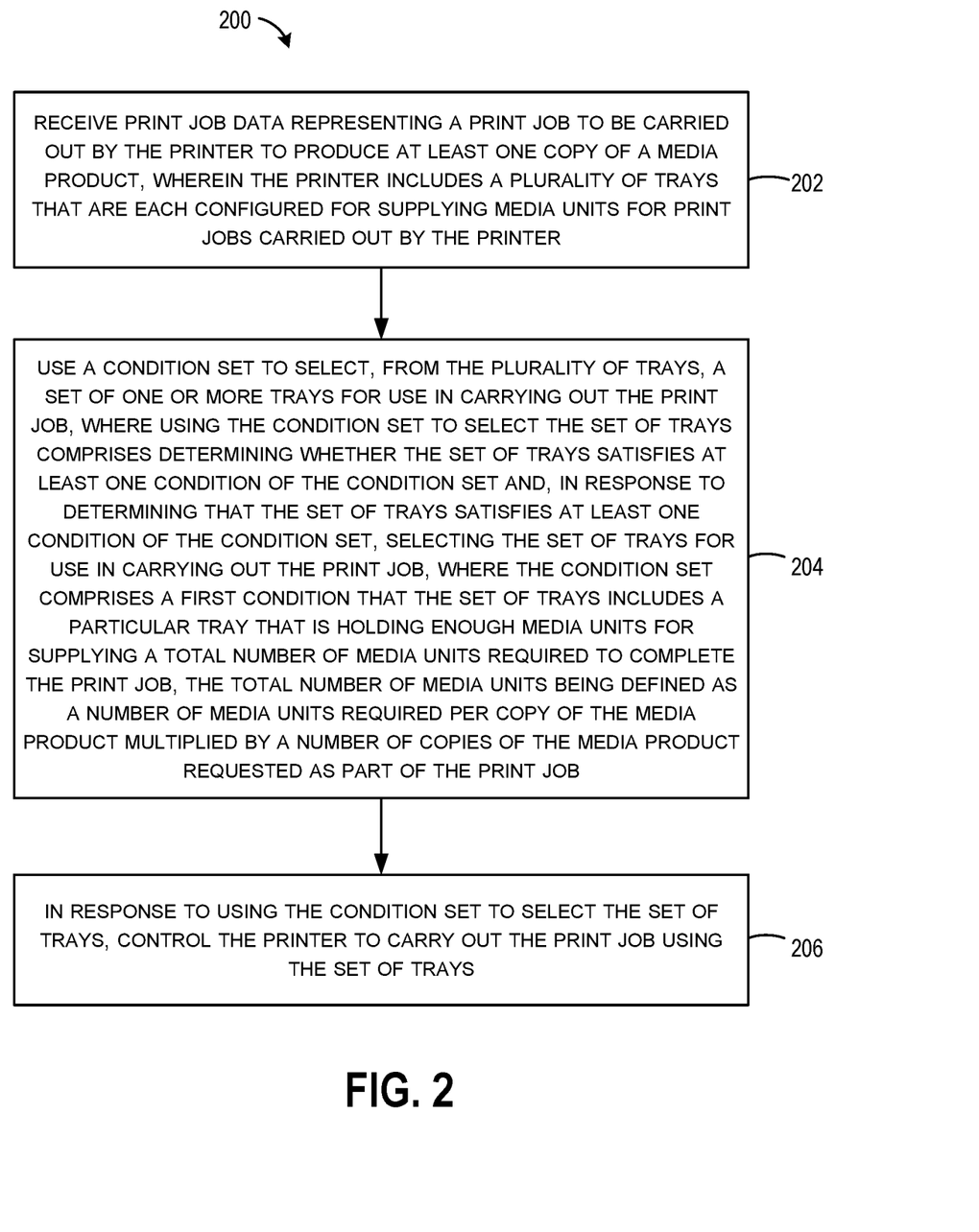
FIG. 2 illustrates a flowchart for controlling feeding of media units in a printer, in accordance with at least some example embodiments.

FIG. 2 is a flowchart for a method, in accordance with at least some example embodiments. Method 200 represents a method for controlling feeding of media units in a printer, where the method 200 can be carried out by a computing device configured to control operations of a printer, such as computing device 102 shown in FIG. 1. Such a computing device can be local to a printer (e.g., an onboard computing device) or remotely positioned from the printer (e.g., a server at a different geographic location from the printer).

Block 202 of method 200 involves receiving print job data representing a print job to be carried out by the printer to produce at least one copy of a media product, wherein the printer includes a plurality of trays that are each configured for supplying media units for print jobs carried out by the printer.

Block 204 of method 200 involves using a condition set to select, from the plurality of trays, a set of one or more trays for use in carrying out the print job, where the act of using the condition set to select the set of trays involves determining whether the set of trays satisfies at least one condition of the condition set and, in response to determining that the set of trays satisfies at least one condition of the condition set, selecting the set of trays for use in carrying out the print job. As discussed above, the condition set can include a first condition that the set of trays includes a particular tray that is holding enough media units for supplying a total number of media units required to complete the print job, where the total number of media units can be defined as a number of media units required per copy of the media product multiplied by a number of copies of the media product requested as part of the print job (e.g., ten sheets of paper per copy and one hundred copies resulting in a total number of one thousand sheets of paper).

Block 206 of method 200 involves, in response to using the condition set to select the set of trays, controlling, by the computing device, the printer to carry out the print job using the set of trays.

In some embodiments, the printer can allow a user to define, with the computing device, media units assigned to a particular tray in at least two different ways. The computing device can store this definition, and thus can determine which trays contain media units having certain defined attributes. For example, the user can specify one or more media unit attributes of media units assigned to a particular tray, such as a media unit weight (e.g., 80 grams per square meter (gsm), 120 gsm, etc.), media unit dimensions (e.g., letter, A4, etc.), a media unit color (e.g., white, blue, etc.), and/or a media unit type (e.g., plain, labels, envelopes, etc.). Additionally or alternatively, the user can select, from a list of defined media unit types having a broader set of media unit attributes (also referred to herein as a "media unit catalog," for brevity), a specific media unit to assign to a particular tray. Examples of media unit attributes that might be included in the media unit catalog can include, but are not limited to, a media unit weight, media unit dimensions, a media unit color, a media unit type, a unique media unit identifier, a media unit brand, a media unit grain (e.g., short or long), a media unit coating (e.g., uncoated, gloss, matte, satin, etc.), a media unit calendaring (e.g., normal, high, etc.), and/or a media unit texture. Other attributes are possible as well and can depend on the type of media unit used in printing.

The print job data received at block 202 can specify one or more preferred job attributes of the print job. Examples of such job attributes can include any one or more of the media unit attributes described above.

In some embodiments, when the print job is queued for printing, the computing device might, before using the tray condition set to select any trays, determine which of the printer's trays are available for use. Within examples, determining whether a tray is available can involve determining, by referring to error codes or in some other manner, that the tray is operating properly such that there are no mechanical issues or obstacles (e.g., a paper jam) that might prevent media units from being fed from the tray. Additionally or alternatively, determining which trays are available can involve determining which trays contain media units in general. Additionally or alternatively, determining which trays are available can involve referring to the assigned media unit attributes of the trays to determine which trays contain media units whose media unit attributes match one or more job attributes specified by the print job. However, in typical practice, one or more of such job attributes might be defined as a range (e.g., 106-136 gsm), which can result in different types of media units, including media units that might be undesired for use in printing, matching a value within the range (e.g., 120 gsm). Similarly, some job attributes, such as color, might be undefined or unspecified in the print job, which can result in different types of media units being fed by trays during printing, including media units that might be undesired for use in printing (e.g., multiple different color media units). By being more particular with tray selection, the disclosed methods and systems can reduce or eliminate the chances of undesired media units being present in media products.

In some embodiments, the tray condition set can include, at a minimum, the first condition described above—namely, the first condition that the set of trays includes a particular tray that is holding enough media units for supplying the total number of media units (also referred to as a number of "impressions," in some scenarios) required to complete the print job. To facilitate this, the computing device can determine a capacity of at least one available tray—that is, an estimate or determination of how many media units are being held by an available tray. The computing device can determine a capacity of a tray in various ways. For example, the maximum capacity of a particular tray can be hard-coded in the software used by the computing device, and the computing device can be communicatively coupled to one or more sensors (e.g., six to twelve sensors) that are configured to measure a current level of the tray, detect the dimensions of the loaded media units in the tray, measure a weight of the current media units in the tray, and/or make other measurements. Thus, the computing device can use readouts from the sensor(s) to determine the capacity of the particular tray relative to the maximum capacity. In some embodiments, the capacity of the tray can be determined at a more granular level than just using sensors. For example, the maximum capacity of a particular tray might be known to the computing device, and the feeding of media units from the tray can be a controlled process such that the tray cannot be unloaded without registering an engine unload event. As such, the computing device can keep track of engine unload events (as well as empty tray events that the computing device registers) to determine the capacity of the tray. Other examples are possible as well.

If the computing device determines that multiple different trays can each supply the total number of media units, the computing device can select one of those trays at random or based on one or more criteria, such as media unit attributes, number of media units held by each tray, and/or other criteria.

Other example conditions that could be part of the tray condition set will now be described in more detail. As such, the tray condition set to be satisfied can include the first condition and one or more of the following conditions. It should be understood, however, that any one or more of the following conditions can be used as an alternative to the first condition. That is, in selecting trays for use in printing, the computing device might determine whether one or more of the following conditions are satisfied without considering whether the first condition is satisfied.

In line with the discussion above, the computing device can first look for a single tray that can supply all the media units needed to complete the print job. Because tray switching can impact productivity, feeding from a single tray (without needing to load the tray during printing) can be optimal. However, other conditions can address the situation where one tray might not be sufficient for completing the print job. For instance, another example condition can be that, if the set of trays does not include a particular tray that is holding enough media units for supplying the total number of media units, the set of trays includes multiple trays that, in combination with each other, are holding enough media units for supplying the total number of media units. For example, if a first tray has 50 sheets and a second tray has 70 sheets, the computing device can select both trays for use in carrying out a print job requiring 100 sheets.

As a result of the set of trays including multiple trays that hold enough media units, the computing device can cause the printer to switch from a first tray to a second tray once the first tray is out of paper, and so on and so forth if additional trays are included in the set of trays. To improve the efficiency with which the printer completes print jobs, in some embodiments, the computing device can be configured to use a minimum possible number of tray switches, including switches to a previously-used tray during printing (e.g., a switch from a first tray to a second tray, and then back to the first tray). To facilitate this, another example condition can be that, if the set of trays does not include a particular tray that is holding enough media units for supplying the total number of media units, the set of trays will require less than a threshold number of tray switches to be performed to complete the print job. For example, if a first tray has 70 sheets, a second tray has 30 sheets, a third tray has 20 sheets, and a fourth tray has 10 sheets, the computing device can select the first and second trays for a print job requiring 100 sheets, as opposed to selecting the first, third, and fourth trays. Other examples are possible as well.

Additionally or alternatively to the conditions described above or elsewhere herein, the computing device can consider whether each tray of the set of trays is holding media units having the same media unit attribute(s) as specified in the print job. Thus, another example condition can be that each tray of the set of trays is holding media units having a media unit attribute that matches the job attribute specified by the print job data. For example, if the print job requires 1000 sheets and paper whose weight is in the range of 106-136 gsm, a first tray has 750 sheets of a 110 gsm paper, a second tray has 500 sheets of a 130 gsm paper, and a third tray has 500 sheets of a 130 gsm paper, the computing device might select the second tray and the third tray to ensure that the print job can be completed without switching to a different paper weight. As a variation on the previous example, if the print job requires 1000 sheets and paper whose weight is in the range of 106-136 gsm, a first tray has 750 sheets of a 110 gsm paper, a second tray has 500 sheets of a 130 gsm paper, a third tray has 500 sheets of a 130 gsm paper, a fourth tray has 150 sheets of a 110 gsm paper, and a fifth tray has 100 sheets of a 110 gsm paper, the computing device might still select the second tray and the third tray to ensure that the print job can be completed without switching to a different paper weight and to minimize tray switches.

In some embodiments, the computing device can be configured to consider certain forms of user-specified preferences for what media unit attributes to use in carrying out the print job. Such user-specified preferences can be included as part of the printing instructions provided by the user (e.g., by way of a client device of the user) to the computing device and/or as part of the job attributes. In some cases, the user-specified preferences can take the form of a priority or policy. For example, the user may specify priority for certain attributes. For instance, if multiple paper weights match a specified weight range, the user may define and then prioritize a policy to use the lightest weight possible (as this might cost less). As such, this defined policy would be applied before other policies, such as before a policy about minimizing tray switching. In addition, the user may also specify that media switching ignore certain attributes (e.g. brand) so that the computing device will switch between papers that are identical once the specified attributes are ignored. Alternatively, the user can specify a list of attributes that should match for media switching so that all other attributes are not used to constraint media switching. For example, the user may state that only dimensions, weight and color be used to limit paper switching so the system may switch between papers of different brands or grains.

Even though there may be numerous media unit attributes available in total to specify as preferred media unit attributes, the user can, in some scenarios, specify less than the total number of those media unit attributes. However, in some embodiments, the total number of media unit attributes from which the user can select preferences is not a fixed list of media unit attributes. Media unit attributes can be added, deleted, or otherwise changed. Further, the user-specified attributes preferred by the user might not be fixed either and can be added, removed, or otherwise changed based on changing user preferences.

To facilitate use of user-specified attributes, the computing device can receive data specifying a plurality of media unit attributes preferred for use in carrying out the print job. For example, the data can be received by way of one of the input device(s) 112 described above. Such data could be received at one point in time and then stored by the computing device in persistent storage, such as memory 118 of the printer 104 described above. Other examples are possible. The data can take the form of a user-defined policy that specifies which media unit attributes the computing device should consider. Furthermore, the data can specify media unit attributes with varying granularity. For example, the data can specify categories of media unit attributes, such as media unit dimensions or media unit color. Additionally or alternatively, the data can specify more specific examples of such attributes, such as Letter or White. Other examples are possible as well.

Accordingly, another example condition is that each tray of the set of trays (whether a single tray, or multiple trays to switch between) is holding media units having media unit attributes that match each media unit attribute in the plurality of media unit attributes specified by the data. For example, consider a scenario where a first tray has Letter, White, 80 gsm paper, a second tray has Letter, Blue, 80 gsm paper, a third tray has Letter, White, 110 gsm paper, and a fourth tray has Letter, White, 80 gsm paper. In this example, the computing device might receive data with user-specified media attributes of Letter (for dimensions) and White (for color). Thus, the computing device could select the first tray, the third tray, and/or the fourth tray.

In some embodiments, the computing device can provide restrictions on the preceding example condition. In particular, the computing device can be configured to consider more media unit attributes in addition to the media unit attributes that the user specifies as preferred media unit attributes, so as not to limit tray selection to potentially broader tray selection criteria. For example, consider a scenario where a first tray has Letter, White, 80 gsm paper, a second tray has Letter, Blue, 80 gsm paper, a third tray has Letter, White, 110 gsm paper, and a fourth tray has Letter, White, 80 gsm paper. In this example, the computing device might be configured, as a result of a stored policy or other data/programming, to only select trays having media units with the same media unit dimensions, media unit color, and media unit weight. However, a user might provide data that indicates a preference of only media unit dimensions and media unit color. In this situation, the computing device, when selecting which trays to use, can still consider media unit weight even though the user did not specify media unit weight as a preferred attribute. Particularly, the computing device might select the first tray and the fourth tray, but the second and third trays would not work because the second tray has the wrong color and the third tray has a different weight than the other trays. As a result, the print job is carried out using paper with the same three attributes, thereby avoiding inconsistencies in attributes across the papers in the printed media product. Other examples are possible as well.

In some embodiments, the computing device can be configured to ignore at least one of the plurality of media unit attributes specified by the data. In such embodiments, after receiving the data, the computing device can receive second data specifying instructions to consider only a first subset of the plurality of media unit attributes and to ignore a second subset of the plurality of media unit attributes, where the first subset and the second subset are mutually exclusive. The second data can be transmitted to the computing device from a client device of a user and/or input into the printer via the input device(s) 112. In some examples, the second data can take the form of executable code that programs the computing device to ignore certain media unit attributes.

Receipt of the second data can change how the computing device determines whether the aforementioned condition that each tray of the set of trays is holding media units having media unit attributes that match each media unit attribute in the plurality of media unit attributes specified by the data is satisfied. Particularly, in response to receiving the second data, the computing device might consider whether each tray of the set of trays is holding media units having media unit attributes that match each media unit attribute in the first subset of media unit attributes specified by the second data, but not consider whether each tray of the set of trays is holding media units having media unit attributes that match any of the media unit attributes in the second subset of media unit attributes. For example, the data might specify dimensions, color, weight, and grain as attributes, whereas the second data might instruct the computing device to ignore grain when selecting trays. Other examples are possible as well.

There can be some scenarios where the computing device determines, after printing has already started, that one or more trays of the set of trays selected for use in printing has/have run out of media unit attributes. In these scenarios, it can be desirable for the computing device to consider more attributes than those specified in the second data and considered before the print job begins being carried out, so as to help ensure that the same attributes are used throughout printing. For instance, if the selected tray(s) run out of media units, the computing device can find one or more additional trays of the printer that have media units with attributes that match all of the attributes in the data.

To facilitate this, while the printer is carrying out the print job, the computing device can determine that the set of trays have insufficient media units for completing a remaining portion of the print job and, in response to determining that the set of trays have insufficient media units for completing the remaining portion of the print job, and based on an additional tray of the printer having media unit attributes that match each media unit attribute in the plurality of media unit attributes specified by the data, the computing device can select the additional tray for the printer to switch to for carrying out the remaining portion of the print job. Then, in response to selecting the additional tray, the computing device can control the printer to carry out the remaining portion of the print job using the additional tray. In some examples, more than one additional tray can be selected in this manner.

As a more particular example, consider a scenario where the data specifies Letter, White, and 80-120 gsm paper and the second data instructed the computing device to consider only a subset of attributes—namely, Letter paper. A first tray might include Letter, White, 80 gsm paper, a second tray might include Letter, Blue, 80 gsm paper, and a third tray might include Letter, White, 120 gsm paper. Because the second data only specifies dimensions as an attribute (in this case, Letter paper), any one or more the three trays might be selected (perhaps based on other conditions as well) to be part of the set of trays because each has Letter paper. But if the first tray is selected and runs out of paper while the printer is carrying out the print job, the computing device can use all of the attributes from the data (i.e., Letter, White, and 80-120 gsm paper) to select an additional tray to switch to complete the print job, which in this particular scenario can be the third tray. Other examples are possible as well. In these and other similar scenarios, the computing device might not switch to another tray unless or until the computing device determines that all attributes of that tray match the data.

In line with the discussion above, some situations may arise where, either during tray selection before the print job starts or after tray selection while the print job is being carried out, one or more trays run out of media units, in which case a user might have to load new media units into such tray(s). The conditions described above might not involve a user having to load new media units, and in some embodiments, such conditions can be prioritized over conditions that are associated with user loading so as to avoid, whenever possible, a user having to load media units.

The following conditions relate to situations where the computing device determines that the printer's trays might not be able to complete the print job without a user having to load more media units in at least one tray. By having the computing device make such a determination ahead of time and then react to the determination, the disclosed systems can improve efficiency in the sense that the computing device can more quickly notify a user that more media units will be needed, thereby giving the user more time to react and load more media units. By contrast, existing solutions might be slower to determine that more media units are needed and/or slower to notify a user that more media units are needed.

Accordingly, in an embodiment where the print job specifies a particular job attribute (or perhaps multiple job attributes), another example condition is that, if the set of trays does not include one or more trays that, individually and in combination, are holding enough media units for supplying the total number of media units, the set of trays includes (a) a first tray holding (i) the highest number of media units of the plurality of trays and (ii) media units having a media unit attribute that matches the job attribute specified by the print job data, and the set of trays also includes (b) a second tray that (i) has a media unit capacity suitable for completing the print job after the first tray is empty and (ii) is able to hold media units having the media unit attribute that matches the job attribute specified by the print job data. In response to determining that this particular condition has been satisfied, the computing device can, within a threshold window of time of controlling the printer to carry out the print job using the set of trays, control a notification device to provide a notification indicating that additional media units are required for the printer to complete the print job. To facilitate determining whether this condition is satisfied, the computing device can determine a media unit capacity of the first tray and the second tray, such as in one or more of the manners discussed above.

As such, when the computing device cannot find one or more trays that can print the entire print job, the computing device begins printing the print job and notifies the user within a threshold window of time of the start of the print job (e.g., ten seconds before starting printing) that additional media units will be needed before such additional media units are actually needed. This can help minimize any pause in production of the media product and can also advantageously minimize the steps for keeping print jobs going continuously.

The notification device can take various forms, such as the notification device 106 described above. For example, the computing device can provide the notification as a message displayed on a display screen of the printer and/or as a message sent to a smartphone of the user. As also discussed above, the notification can be an audio and/or visual notification, such as a text message, audio message, email, etc. that indicates to the user that additional media units are required for the printer to complete the print job. The notification might also include other information as well, such as an identification of a tray or trays (e.g., Tray 1, Tray 2, etc.) to which the user should provide (e.g., load) the additional media units, a number of media units required to complete the print job. Other example variations on the notification are possible as well.

In embodiments where this condition is satisfied and additional media units are required, the act of the computing device controlling the printer to carry out the print job using the set of trays can involve the following steps: (i) within a threshold window of time of controlling the printer to carry out the first portion of the print job using the first tray, control the printer to enable access to the second tray such that a user can provide the additional media units to the second tray, (ii) determine that the additional media units have the media unit attribute that matches the job attribute specified by the print job data, and (iii) in response to determining that the additional media units have the media unit attribute that matches the job attribute specified by the print job data, control the printer to carry out a second portion of the print job using the second tray after the first portion of the print job is complete. To enable access to the second tray, the computing device can unlock, lower, and/or perform other actions that allow the user to load the additional media units.

In scenarios where the user elects not to provide the additional media units and complete the print job, the computing device might take one or more responsive actions. For example, if the computing device detects that the additional media units have not been loaded, the computing device might restrict tray switching based on one or more of the aforementioned conditions and criteria, thereby helping to ensure that the entire print job is produced using consistent media units (e.g., entirely with Letter, White, 80 gsm paper). For instance, although multiple media units might be eligible for use in completing the print job, once a specific media unit has been used to complete a first portion of the print job, that specific media unit will be used to finish the remaining portion of the print job, and the computing device might not switch to any other media units even if such media units meet requirements specified in the print job data (e.g., job attribute(s)).

Additionally or alternatively to performing the method 200 and associated operations before printing of the print job commences, the computing device can perform at least some of the operations described herein after printing has begun. In some scenarios, for instance, the computing device might detect that the media units held by one or more of the printer's trays have changed while the print job is being carried out. This might result from a user loading new media units into a tray (with or without being prompted by the printer to do so), removing media units from a tray, and/or swapping media units between trays, among other possible causes. In response to detecting that the media units held by such tray(s) have changed, the computing device might determine that a tray that previously did not meet condition(s) of the tray condition set now meets at least the first condition of the tray condition set and can responsively add the tray to the set of trays. Other examples are possible as well.

As noted above, the computing device might have access to a queue of print jobs for the printer and can take multiple print jobs from the queue, including the print job of method 200, into account when selecting the set of trays. Thus, the computing device can be even more proactive and help multiple different print jobs to be carried out as efficiently as possible.

For example, the queue can include multiple print jobs, such as the print job referred to in method 200 and a second print job to be carried out by the printer to produce at least one copy of a second media product. Given this queue, in some embodiments, another example condition is that the set of trays consists of one or more trays that, individually or in combination, are holding enough media units for supplying a total number of media units required to complete the second print job, the total number of media units being defined as a number of media units required per copy of the second media product multiplied by a number of copies of the second media product requested as part of the second print job. Additionally or alternatively, any one or more of the other example conditions described above could be considered by the computing device with respect to the second print job, its job attributes, etc., in selecting which tray(s) should be included in the set of trays.

In some embodiments, the computing device can be configured to reorder one or more of the print jobs in the queue based on one or more criteria associated with the media units currently (e.g., at the time the computing device makes the determination) in the printer's trays. To facilitate this, the computing device might consider the one or more criteria with respect to each print job in the queue, or with respect to a predefined number of print jobs ahead of the current print job in the queue. Example criteria can include a number of media units remaining in one or more of the printer's trays, a number of media units required by one or more of the print jobs in the queue, media unit dimensions of the media units remaining in one or more of the printer's trays, and/or the media unit dimensions required by one or more of the print jobs in the queue, among other example possibilities.

Consider, for example, a scenario where there are ten print jobs in the queue. The computing device can be configured to look ahead to no more than the next three print jobs in the queue, Print Job 1, Print Job 2, and Print Job 3. The computing device can also determine that Print Job 1 requires 50 sheets of Letter, White, 80-120 gsm, Print Job 2 requires 50 sheets of Letter, Blue, 80-120 gsm paper, and Print Job 3 requires 20 sheets of Letter, White, 80-120 gsm paper. The computing device can also determine that a first tray holds 60 sheets of Letter, White, 120 gsm paper and a second tray holds 40 sheets of Letter, White, 120 gsm paper. Based on these determinations, the computing device can switch the positions of Print Job 2 and Print Job 3 in the queue so that, after the first tray is selected to print the entirety of Print Job 1, the first tray can be used to print the first 10 sheets of Print Job 3, and then a switch to the second tray will occur to print the remaining 40 sheets of Print Job 3. Thus, minimal tray switches will occur across the three print jobs. For example, if Print Job 2 and Print Job 3 are not switched, the printer would have to switch to a tray having Letter, Blue, 80-120 gsm paper (unless no such tray exists and loading is then required, which takes additional time), and then switch back to either the first or second tray to complete Print Job 3. Other examples are possible as well.

In some embodiments, one or more of the operations described above as being performed by a user might be automated and performable by the computing device and the printer. For example, the printer might have, in a storage that is local to the printer, media units and, instead of the user loading new media units into a tray, the computing device might control the printer to reload the tray itself by accessing and transferring media units from the storage to the tray. Other examples are possible as well.

IV. Example Operations for Controlling Output of Media Units

Figure 3:
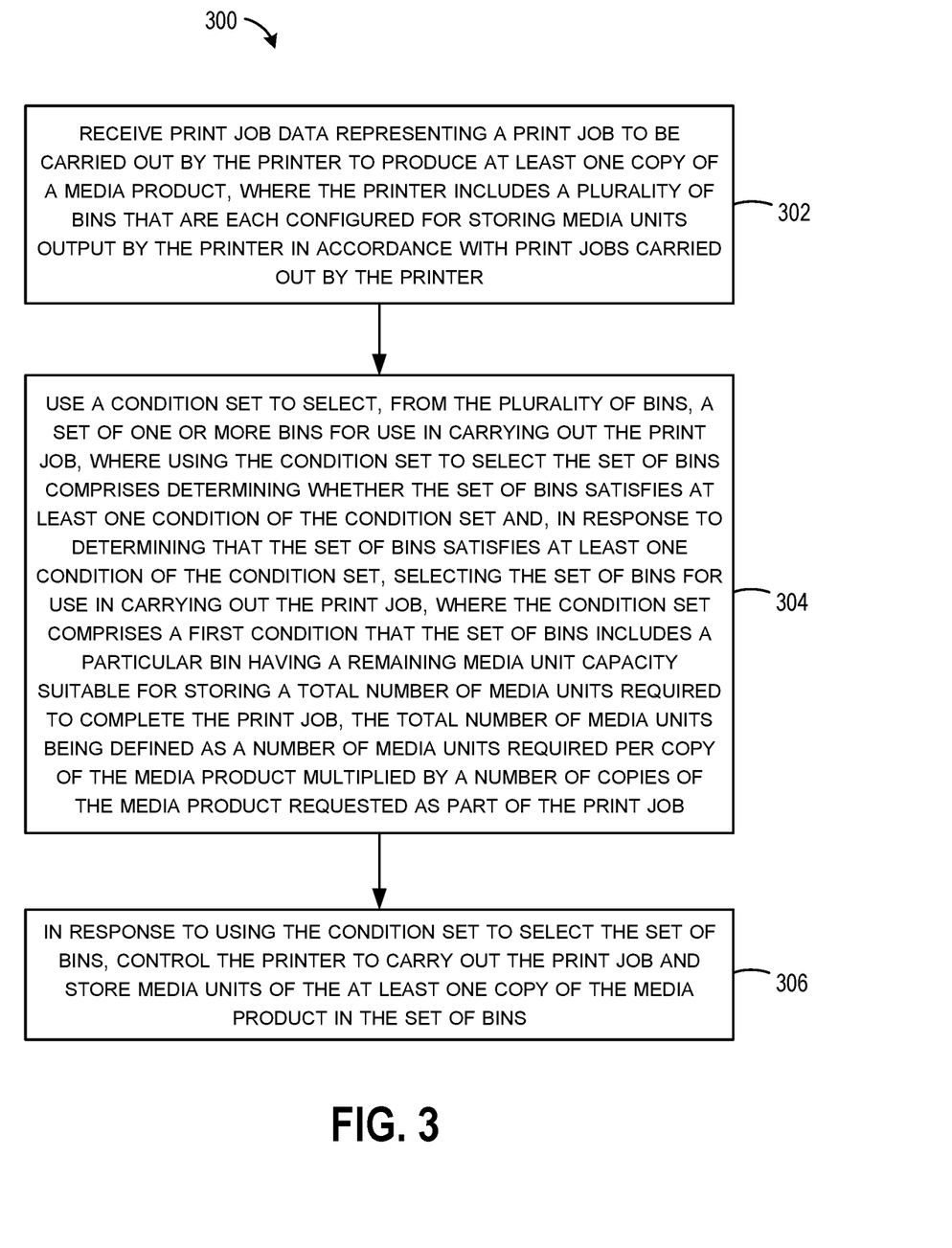
FIG. 3 illustrates a flowchart for controlling media unit output of a printer, in accordance with at least some example embodiments.

FIG. 3 is a flowchart for a method, in accordance with at least some example embodiments. Method 300 represents a method for controlling output of media units in a printer, where the method 300 can be carried out by a computing device configured to control operations of a printer, such as computing device 102 shown in FIG. 1. Such a computing device can be local to a printer (e.g., an onboard computing device) or remotely positioned from the printer (e.g., a server at a different geographic location from the printer).

Block 302 of method 300 involves receiving print job data representing a print job to be carried out by the printer to produce at least one copy of a media product, wherein the printer includes a plurality of bins that are each configured for storing media units output by the printer in accordance with print jobs carried out by the printer. The print job can be the same print job described above with respect to FIG. 2 and method 200, or can be any other print job carried out by the printer.

Block 304 of method 300 involves using a condition set to select, from the plurality of bins, a set of one or more bins for use in carrying out the print job, where the act of using the condition set to select the set of bins involves determining whether the set of bins satisfies at least one condition of the condition set and, in response to determining that the set of bins satisfies at least one condition of the condition set, selecting the set of bins for use in carrying out the print job. As discussed above, the condition set comprises a first condition that the set of bins includes a particular bin having a remaining media unit capacity suitable for storing a total number of media units required to complete the print job, where the total number of media units can be defined as a number of media units required per copy of the media product multiplied by a number of copies of the media product requested as part of the print job (e.g., ten sheets of paper per copy and one hundred copies resulting in a total number of one thousand sheets of paper).

Block 306 of method 300 involves in response to using the condition set to select the set of bins, controlling the printer to carry out the print job and store media units of the at least one copy of the media product in the set of bins.

In some embodiments, when the print job is queued for printing, the computing device might, before using the bin condition set to select any bins, determine which of the printer's bins are available for use. Within examples, determining whether a bin is available can involve determining, by referring to error codes or in some other manner, that the bin is operating properly such that there are no mechanical issues or obstacles (e.g., a paper jam) that might prevent media units from being output to the bin. Additionally or alternatively, determining which bins are available can involve determining which bins contain media units in general and/or how many media units each bin is currently holding.

In some embodiments, the bin condition set can include, at a minimum, the first condition described above in this section—namely, the first condition that the set of bins includes a particular bin having a remaining media unit capacity suitable for storing a total number of media units required to complete the print job. To facilitate this, the computing device can determine a capacity of at least one available bin—that is, an estimate or determination of how many media units are being held by an available bin. The computing device can determine a capacity of a bin in various ways. For example, the maximum capacity of a particular bin can be hard-coded in the software used by the computing device, and the computing device can be communicatively coupled to one or more sensors (e.g., six to twelve sensors) that are configured to measure a current level of the bin, detect the dimensions of the loaded media units in the bin, measure a weight of the current media units in the bin, and/or make other measurements. Thus, the computing device can use readouts from the sensor(s) to determine the capacity of the particular bin relative to the maximum capacity. In some embodiments, the capacity of the bin can be determined at a more granular level than just using sensors. For example, the maximum capacity of a particular bin might be known to the computing device, and the delivery of media units to the bin can be a controlled process such that the bin cannot be unloaded without registering an engine unload event. As such, the computing device can keep track of engine unload events (as well as empty bin events that the computing device registers) to determine the capacity of the bin. Other examples are possible as well.

If the computing device determines that multiple different bins can each store the total number of media units, the computing device can select one of those bins at random or based on one or more criteria, such as media unit attributes, number of media units currently stored in each bin, and/or other criteria.

Other example conditions that could be part of the bin condition set will now be described in more detail. As such, the bin condition set to be satisfied can include the first condition and one or more of the following conditions. It should be understood, however, that any one or more of the following conditions can be used as an alternative to the first condition. That is, in selecting bins for use in printing, the computing device might determine whether one or more of the following conditions are satisfied without considering whether the first condition is satisfied.

In line with the discussion above, the computing device can first look for a single bin that has the capacity to store all the media units needed to complete the print job. This can be performed with or without considering the media unit dimensions required for the print job and specified by the print job data. For example, another example condition can be that the particular bin (e.g., the single bin identified as a result of the first condition) is configured for storing media units having media unit dimensions that are greater than or equal to the media unit dimensions specified by the print job data. In alternative examples, this condition might only be met if the particular bin is configured for storing media units having media unit dimensions that equal the media unit dimensions specified by the print job data. In other alternative examples, this condition might be met if the particular bin is configured for storing media units having media unit dimensions that fall within a range of media unit dimensions specified by the print job data. Other examples are possible as well. In some embodiments, this condition involving media unit dimensions can be considered in determining whether a particular bin is available (i.e., before the first condition is considered).

Because bin switching can impact productivity, outputting to a single bin (without needing to unload the bin during printing) can be optimal. However, other conditions can address the situation where one bin might not be sufficient for storing the whole print job. For instance, another example condition can be that, if the set of bins does not include a particular bin having a remaining media unit capacity suitable for storing the total number of media units required to complete the print job, the set of bins includes multiple bins that, in combination with each other, have a remaining media unit capacity suitable for storing the total number of media units. For example, if a first bin and a second bin each have a remaining media unit capacity of 50 sheets, the computing device can select both bins for use in storing a print job requiring 100 sheets.

As a result of the set of bins including multiple bins, the computing device can cause the printer to switch from outputting media units to a first bin to outputting media units to a second bin, and so on and so forth if additional bins are included in the set of bins. Switching from one bin to the next can occur at various times. For example, the computing device can switch from printing to the first bin to print to the second bin once the computing device determines that the first bin is full (e.g., has no more remaining capacity).

However, there can be some scenarios where it can be even more efficient to use a different basis for determining how to split up the print job across multiple bins. For example, when the computing device determines that the set of bins includes multiple bins that, in combination with each other, have a remaining media unit capacity suitable for storing the total number of media units, the computing device can responsively determine one or more "break points" that define how the print job is split up among the multiple bins. As such, the computing device can control the printer to carry out the print job and store media units of the at least one copy of the media product in the set of bins in accordance with the determined one or more break points.

The one or more break points can be determined in various ways. For example, when the print job involves printing multiple copies of the media product, the computing device can determine the break point(s) to be breaks between the multiple copies of the media product. As a more particular example, the print job might involve printing a first copy and a second copy of the media product, in which case the computing device can switch bins at a break point between the first and second copies of the media product, such that the break point corresponds to a break between printing of the first copy of the media product and printing of the second copy of the media product.

Additionally or alternatively, the computing device can determine the break point(s) to be breaks between the media products, particularly when the media product of the print job includes multiple media products. For example, the print job can produce multiple media products intended for different recipients, such as a utility or credit card bill for a first household and a utility or credit card bill for a second, different household. Some post-printing systems (e.g., a printer finisher for stapling, hole-punching, folding, collating, cutting, etc.) can be used for barcode verification or another technique that ensures that a media product intended for a particular recipient is complete and not mixed with any media units intended for another recipient. Thus, by placing the break point(s) between multiple media products in this way, the printer or a user can load the output from the print job into a post-printing system without having to worry about a partial media product. As a more particular example of using breaks between media products of a print job as break points, the media product that is the subject of the print job might include a first media product associated with a first intended recipient and a second media product associated with a second, different intended recipient, in which case the computing device can switch bins at a break point between the two media products, such that the break point corresponds to a break between printing of the first media product associated with the first intended recipient and printing of the second media product associated with the second intended recipient.

Additionally or alternatively, the computing device can determine the break point(s) to be one or more "offset boundaries" that the printer has been instructed or configured to provide in carrying out the print job. This action is also sometimes referred to as jogging or disjointing, and can be performed by a printer for various reasons, such as making it easier for users to see where one copy/media product ends and the next copy/media product begins. An offset boundary can be a physical offset between every m media units of the media product that are printed and/or a physical offset between every n copies of the media product that are printed, where m is an integer greater than zero and n is an integer greater than zero. In some examples, the print job might include an instruction for the printer to provide the one or more offset boundaries in carrying out the print job, and perhaps in one or more other print jobs as well. In other examples, the printer might have settings from which the user can select, such as toggling offset boundaries on and off. In still other examples, the printer might be configured to provide a particular type of offset boundary (e.g., between every m media units of the media product that are printed and/or a physical offset between every n copies of the media product that are printed) by default and can operate according to the default setting unless otherwise instructed by the user or the print job. By treating offset boundaries as break points, the computing device can help ensure that blocks of jogged media units are not split up, thereby increasing productivity.

In some embodiments, while the printing is being carried out, the computing device can, within a threshold period of time (e.g., fifteen seconds) before or after the printer reaches one of the break points, calculate a remaining capacity in the current bin being used. If the computing device determines that the remaining capacity in the current bin is not enough to print a remaining quantity of media units before a subsequent break point, the computing device might proactively switch to a new bin. This can help ensure that the number of media units between the break point(s) is maximized. For example, the printer might be configured to place an offset boundary between every 50 sheets printed. In this example, after a first offset boundary and before the second, subsequent offset boundary is reached, the computing device can determine that a first bin currently being used to store output media units only has a remaining capacity of 30 sheets and responsively switch to a second bin. To facilitate these and other operations, the computing device can be configured to continuously or periodically determine the remaining capacity of the current bin and/or other bins, using one or more sensors, such as the sensor(s) discussed above. In some scenarios, the computing device might pause after an offset is reached, determine the remaining capacity of the current bin, and then switch to a new bin before resuming printing. In other scenarios, no substantial pausing (e.g., one second or more) can occur while switching bins.

In line with the discussion above, some situations may arise where, either during bin selection before the print job starts or after bin selection while the print job is being carried out, one or more bins become full, in which case a user might have to unload media units from such bin(s). The conditions described above might not involve a user having to unload media units, and in some embodiments, such conditions can be prioritized over conditions that are associated with user unloading so as to avoid, whenever possible, a user having to unload media units.

The following conditions relate to situations where the computing device determines that the printer's bins might not be able to store the entire print job without a user having to unload media units from at least one bin. By having the computing device make such a determination ahead of time and then react to the determination, the disclosed systems can improve efficiency in the sense that the computing device can more quickly notify a user that media units will have to be unloaded, thereby giving the user more time to react and unload media units. By contrast, existing solutions might be slower to determine, or might not be configured to determine, that media units have to be unloaded and/or might be slower to notify a user that media units should be unloaded.

Accordingly, another example condition is that, if the set of bins does not include a particular bin having a remaining media unit capacity suitable for storing the total number of media units required to complete the print job, the set of bins includes only a single bin that is currently partially-filled with media units, but has a media unit capacity suitable for storing the total number of media units required to complete the print job. In other words, if no bin can hold the entire print job, the computing device might determine whether unloading a bin would enable printing of the entire job to a single bin. For example, a bin with a capacity of 5000 sheets may hold 2000 sheets, and thus a print job requiring 4000 sheets can be sent to that bin if the bin is unloaded.

To facilitate determining whether this condition is satisfied, the computing device can determine a media unit capacity of at least one bin, such as in one or more of the manners discussed above. If the computing device determines that this condition has been satisfied, the computing device can responsively control the notification device to provide a notification indicating that the media units currently in the single bin must be unloaded for the printer to complete the print job. The notification device and/or the notification can take forms similar to those described above with respect to tray selection. Additionally or alternatively, the computing device can control the printer to enable access to the single bin such that a user can unload the media units that are currently in the single bin. To enable access to the single bin, or any bin, for that matter, the computing device can unlock, lower, and/or perform other actions that allow the user to unload the bin.

The act of the computing device controlling the notification device and/or the act of the computing device controlling the printer to enable access to the single bin can be performed before controlling the printer to carry out the print job and store media units of the at least one copy of the media product in the set of bins. Additionally or alternatively, one or both acts can be performed within a threshold window of time of controlling the printer to carry out the print job, such as within ten seconds before or after instructing the printer to begin printing. Other example thresholds are possible. Controlling the timing of the notification and/or the enabling of access to the single bin can help minimize any pause in production of the media product and can also advantageously minimize the steps for keeping print jobs going continuously.

In some scenarios, a single bin, even if unloaded, might not be able to store the total number of media units for the print job. In such scenarios, the computing device can be configured to split the output between two or more bins where at least one of such bins will be unloaded. As such, another example condition is that, if the set of bins does not include one or more bins that, individually and in combination, have a remaining media unit capacity suitable for storing the total number of media units, the set of bins includes (i) a first bin having a remaining media unit capacity suitable for storing a first portion of the total number of media units and (ii) a second bin that is currently partially-filled with media units, but has a media unit capacity suitable for storing a second portion of the total number of media units.

If the computing device determines that this condition has been satisfied, the computing device can responsively control the notification device to provide a notification indicating that the media units currently in the second bin must be unloaded for the printer to complete the print job. The notification device and/or the notification can take forms similar to those described above with respect to tray selection. Additionally or alternatively, the computing device can control the printer to enable access to the second bin such that a user can unload the media units that are currently in the second bin.

The act of the computing device controlling the notification device and/or the act of the computing device controlling the printer to enable access to the second bin can be performed before controlling the printer to carry out the print job and store media units of the at least one copy of the media product in the set of bins. Additionally or alternatively, one or both acts can be performed within a threshold window of time of controlling the printer to carry out the print job, such as within ten seconds before or after instructing the printer to begin printing. Other example thresholds are possible. Controlling the timing of the notification and/or the enabling of access to the second bin can help minimize any pause in production of the media product and can also advantageously minimize the steps for keeping print jobs going continuously.

In some embodiments, the computing device can consider the media unit dimensions of media units currently stored in a bin, in addition to considering media unit dimensions, when determining if the bin, if unloaded, could be suitable for helping store the print job. For example, a bin might have a capacity of 5000 sheets. If that bin is storing 2000 Letter sheets, then it might not be able to store any other sheet dimensions (e.g., tabloid). Thus, if a print job requiring 2000 tabloid sheets is queued for printing, the computing device might take actions to facilitate the unloading of the 5000-sheet bin even if there are other empty bins that cannot hold 2000 sheets. Other examples are possible as well.

The computing device can, in some embodiments, be configured to prioritize certain conditions over others. For example, in bin selection, the computing device might select bins as follows, listed in order of preference: one bin that can hold the entire print job, one bin that can hold the entire print job without any bin having to be emptied, two or more bins that can hold the entire print job without any bin having to be emptied, and two or more bins that can hold the entire print job if at least one of them is emptied. Other preferences are possible as well.

Additionally or alternatively to performing the method 300 and associated operations before printing of the print job commences, the computing device can perform at least some of the operations described herein after printing has begun. In some scenarios, for instance, the computing device might detect that the media units stored by one or more of the printer's bins have changed while the print job is being carried out, such as a change in quantity of media units stored. This might result from a user unloading media units from a bin (with or without being prompted by the printer to do so) or moving media units from one bin to another, among other possible causes. In response to detecting that the media units held by such bin(s) have changed, the computing device might determine that a bin that previously did not meet condition(s) of the bin condition set now meets at least the first condition of the bin condition set and can responsively add the bin to the set of bins. Other examples are possible as well.

As noted above, the computing device might have access to a queue of print jobs for the printer and can take multiple print jobs from the queue, including the print job of method 300, into account when selecting the set of bins. Thus, the computing device can be even more proactive and help multiple different print jobs to be carried out as efficiently as possible.

For example, the queue can include multiple print jobs, such as the print job referred to in method 300 and a second print job to be carried out by the printer to produce at least one copy of a second media product. Given this queue, in some embodiments, another example condition is that the set of bins consists of one or more bins that, individually or in combination, have a remaining media unit capacity suitable for storing the total number of media units required to complete the second print job, the total number of media units being defined as a number of media units required per copy of the second media product multiplied by a number of copies of the second media product requested as part of the second print job. Additionally or alternatively, any one or more of the other example conditions described above could be considered by the computing device with respect to the second print job, its job attributes, determined break points, etc., in selecting which bin(s) should be included in the set of bins.

In some embodiments, the computing device can be configured to reorder one or more of the print jobs in the queue based on one or more criteria associated with the media units currently (e.g., at the time the computing device makes the determination) in the printer's bins. To facilitate this, the computing device might consider the one or more criteria with respect to each print job in the queue, or with respect to a predefined number of print jobs ahead of the current print job in the queue. Example criteria can include a number of media units currently being stored in one or more of the printer's bins, a remaining capacity of one or more of the printer's bins, a number of media units required by one or more of the print jobs in the queue, media unit dimensions of the media units currently being stored in one or more of the printer's bins, and/or the media unit dimensions required by one or more of the print jobs in the queue, among other example possibilities. In some situations, the computing device can be configured to prioritize its consideration of the number of media units (e.g., currently in the bin, remaining capacity for the bin, and/or required by the print job(s)) over all other criteria, and might be configured to also prioritize its consideration of the media unit dimensions (e.g., of media units in the bins and/or required by the print job(s)) above all other criteria except the number of media units. Other example priorities are possible as well.

Consider, for example, a scenario where there are ten print jobs in the queue. The computing device can be configured to look ahead to no more than the next three print jobs in the queue, Print Job 1, Print Job 2, and Print Job 3. The computing device can also determine that Print Job 1 requires 50 sheets of Letter, White, 80-120 gsm paper, Print Job 2 requires 50 sheets of Letter, White, 80-120 gsm paper, and Print Job 3 requires 20 sheets of Letter, White, 80-120 gsm paper. The computing device can also determine that a first bin has a remaining capacity of 70 sheets. Based on these determinations, the computing device can switch the positions of Print Job 2 and Print Job 3 in the queue so that, after the first bin is selected to store the entirety of Print Job 1, the first bin can then be used to store all 20 sheets of Print Job 3. Then, either a switch to another bin will occur or an unloading of the first bin will be prompted. Thus, the number of bin switches across the three print jobs will be minimized, while also eliminating the splitting of a job between two bins or between bin unload events. Other examples are possible as well.

In some embodiments, the computing device can be configured such that, when a first job is in progress and the selected bin(s) run out of media units (thus making the first job partially produced), the computing device will wait for a predefined period of time (e.g., one minute) for additional media units to be loaded into the selected bins. If media units are not loaded within the predefined period of time, the computing device can determine, using any one or more of the methods and considerations described above, whether there are other available bin(s). If so, the computing device might, in this scenario, print a second job—namely, the next job in the queue—to the other available bin(s) to help ensure that the printer can keep printing without being held up by the selected bin(s) having run out of media units. Furthermore, in this scenario, the computing device can, in response to the predefined period of time expiring, modify the bin switching process so that no jobs use the bin(s) that are being used in the partially-produced job, effectively reserving those bin(s) for completing the partially-produced job. The second job can then be printed from the other bin(s) until the media units needed to complete the partially-produced job are loaded. At that point, the computing device can either immediately resume printing to the bin(s) it was previously using to output media units for the first job, or can resume after the currently printing job (i.e., the second job) is complete.

In some embodiments, one or more of the operations described above as being performed by a user might be automated and performable by the computing device and the printer. For example, the printer might have, in a storage that is local to the printer, media units and, instead of the user unloading media units from a bin, the computing device might control the printer to unload the bin itself by accessing and transferring media units from the bin to storage, to a post-printing system (e.g., a finisher), or elsewhere. Other examples are possible as well.

V. Conclusion

The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method for controlling media unit output of a printer, the method comprising:

receiving, by a computing device configured to control operation of the printer, print job data representing a print job to be carried out by the printer to produce at least one copy of a media product, wherein the printer includes a plurality of bins that are each configured for storing media units output by the printer in accordance with print jobs carried out by the printer;

using, by the computing device, a condition set to select, from the plurality of bins, a set of one or more bins for use in carrying out the print job, wherein using the condition set to select the set of bins comprises determining whether the set of bins satisfies at least one condition of the condition set and, in response to determining that the set of bins satisfies at least one condition of the condition set, selecting the set of bins for use in carrying out the print job, wherein the condition set comprises a first condition that the set of bins includes a particular bin having a remaining media unit capacity suitable for storing a total number of media units required to complete the print job, the total number of media units being defined as a number of media units required per copy of the media product multiplied by a number of copies of the media product requested as part of the print job; and in response to using the condition set to select the set of bins, controlling, by the computing device, the printer to carry out the print job and store media units of the at least one copy of the media product in the set of bins.

2. The method of claim 1, wherein the condition set further comprises a second condition that, if the set of bins does not include a particular bin having a remaining media unit capacity suitable for storing the total number of media units required to complete the print job, the set of bins includes multiple bins that, in combination with each other, have a remaining media unit capacity suitable for storing the total number of media units.

3. The method of claim 2, further comprising:
determining, by the computing device, that the second condition has been satisfied; and
in response to determining that the second condition has been satisfied, determining, by the computing device, one or more break points defining how the print job is split up amongst the multiple bins,
wherein controlling the printer to carry out the print job and store media units of the at least one copy of the media product in the set of bins comprises controlling the printer to carry out the print job and store media units of the at least one copy of the media product in the multiple bins in accordance with the determined one or more break points.

4. The method of claim 3, wherein the print job comprises printing a first copy of the media product and a second copy of the media product, and
wherein determining the one or more break points comprises determining the one or more break points to be a break point between the first and second copies of the media product, such that the break point corresponds to a break between printing of the first copy of the media product and printing of the second copy of the media product.

5. The method of claim 3, wherein the media product comprises a first media product associated with a first intended recipient and a second media product associated with a second, different intended recipient, and
wherein determining the one or more break points comprises determining the one or more break points to be a break point between the first and second media products, such that the break point corresponds to a break between printing of the first media product associated with the first intended recipient and printing of the second media product associated with the second intended recipient.

6. The method of claim 3, wherein the print job comprises an instruction for the printer to provide one or more offset boundaries in carrying out the print job, wherein the one or more offset boundaries comprise a physical offset between every m media units of the media product that are printed or a physical offset between every n copies of the media product that are printed,
wherein m and n are each integers greater than zero, and
wherein determining the one or more break points comprises determining the one or more break points to be the one or more offset boundaries.

7. The method of claim 1, wherein the condition set further comprises a second condition that, if the set of bins does not include a particular bin having a remaining media unit capacity suitable for storing the total number of media units required to complete the print job, the set of bins includes only a single bin that is currently partially-filled with media units, but has a media unit capacity suitable for storing the total number of media units required to complete the print job.

8. The method of claim 7, further comprising:
determining, by the computing device, that the second condition has been satisfied; and
in response to determining that the second condition has been satisfied, and before controlling the printer to carry out the print job and store media units of the at least one copy of the media product in the set of bins, controlling, by the computing device, a notification device to provide a notification indicating that the media units currently in the single bin must be unloaded for the printer to complete the print job.

9. The method of claim 8, further comprising:
before controlling the printer to carry out the print job and store media units of the at least one copy of the media product in the set of bins, controlling, by the computing device, the printer to enable access to the single bin such that a user can unload the media units that are currently in the single bin.

10. The method of claim 1, wherein the print job data specifies media unit dimensions required for the print job, and
wherein the condition set further comprises a second condition that the particular bin is configured for storing media units having media unit dimensions that are greater than or equal to the media unit dimensions specified by the print job data.

11. The method of claim 1, wherein the condition set further comprises a second condition that, if the set of bins does not include one or more bins that, individually and in combination, have a remaining media unit capacity suitable for storing the total number of media units, the set of bins includes (i) a first bin having a remaining media unit capacity suitable for storing a first portion of the total number of media units and (ii) a second bin that is currently partially-filled with media units, but has a media unit capacity suitable for storing a second portion of the total number of media units.

12. The method of claim 11, further comprising:
determining, by the computing device, that the second condition has been satisfied; and
in response to determining that the second condition has been satisfied, and before controlling the printer to carry out the print job and store media units of the at least one copy of the media product in the set of bins, controlling, by the computing device, a notification device to provide a notification indicating that the media units currently in the second bin must be unloaded for the printer to complete the print job.

13. The method of claim 12, further comprising:
before controlling the printer to carry out the print job and store media units of the at least one copy of the media product in the set of bins, controlling, by the computing device, the printer to enable access to the second bin such that a user can unload the media units that are currently in the second bin.

14. The method of claim 1, wherein the print job is a first print job, wherein the computing device has access to a queue of print jobs for the printer, the queue including the first print job and further including a second print job to be carried out by the printer to produce at least one copy of a second media product, and wherein the condition set further comprises a second condition that the set of bins consists of one or more bins that, individually or in combination, have a remaining media unit capacity suitable for storing the total number of media units required to complete the second print job, the total number of media units being defined as a number of media units required per copy of the second media product multiplied by a number of copies of the second media product requested as part of the second print job.

15. A system comprising:

a printer, wherein the printer includes a plurality of bins that are each configured for storing media units output by the printer in accordance with print jobs carried out by the printer; and a computing device configured to:

receive a print job data representing a print job to be carried out by the printer to produce at least one copy of a media product;

use a condition set to select, from the plurality of bins, a set of one or more bins for use in carrying out the print job, wherein using the condition set to select the set of bins comprises determining whether the set of bins satisfies at least one condition of the condition set and, in response to determining that the set of bins satisfies at least one condition of the condition set, selecting the set of bins for use in carrying out the print job, wherein the condition set comprises a first condition that the set of bins includes a particular bin having a remaining media unit capacity suitable for storing a total number of media units required to complete the print job, the total number of media units being defined as a number of media units required per copy of the media product multiplied by a number of copies of the media product requested as part of the print job; and in response to using the condition set to select the set of bins, control the printer to carry out the print job and store media units of the at least one copy of the media product in the set of bins.

16. The system of claim 15, wherein the condition set further comprises a second condition that, if the set of bins does not include a particular bin having a remaining media unit capacity suitable for storing the total number of media units required to complete the print job, the set of bins includes multiple bins that, in combination with each other, have a remaining media unit capacity suitable for storing the total number of media units.

17. The system of claim 15, wherein the computing device is further configured to:

determining that the second condition has been satisfied; and in response to determining that the second condition has been satisfied, determining one or more break points defining how the print job is split up amongst the multiple bins, wherein controlling the printer to carry out the print job and store media units of the at least one copy of the media product in the set of bins comprises controlling the printer to carry out the print job and store media units of the at least one copy of the media product in the multiple bins in accordance with the determined one or more break points.

18. The system of claim 17, wherein the print job is to produce multiple copies of the media product, and wherein determining the one or more break points comprises determining the one or more break points to be break points between the multiple copies of the media product, such that each break point corresponds to a break between a respective pair of sequential copies of the media product.

19. The system of claim 15, wherein the print job is a first print job, wherein the computing device has access to a queue of print jobs for the printer, the queue including the first print job and further including a second print job to be carried out by the printer to produce at least one copy of a second media product, and wherein the condition set further comprises a second condition that the set of bins consists of one or more bins that, individually or in combination, have a remaining media unit capacity suitable for storing the total number of media units required to complete the second print job, the total number of media units being defined as a number of media units required per copy of the second media product multiplied by a number of copies of the second media product requested as part of the second print job.

20. An article of manufacture comprising non-transitory data storage storing at least computer-readable instructions that, when executed by one or more processors of a computing device, cause the computing device to perform operations comprising:

receiving print job data representing a print job to be carried out by a printer to produce at least one copy of a media product, wherein the printer includes a plurality of bins that are each configured for storing media units output by the printer in accordance with print jobs carried out by the printer;

using a condition set to select, from the plurality of bins, a set of one or more bins for use in carrying out the print job, wherein using the condition set to select the set of bins comprises determining whether the set of bins satisfies at least one condition of the condition set and, in response to determining that the set of bins satisfies at least one condition of the condition set, selecting the set of bins for use in carrying out the print job, wherein the condition set comprises a first condition that the set of bins includes a particular bin having a remaining media unit capacity suitable for storing a total number of media units required to complete the print job, the total number of media units being defined as a number of media units required per copy of the media product multiplied by a number of copies of the media product requested as part of the print job; and in response to using the condition set to select the set of bins, controlling the printer to carry out the print job and store media units of the at least one copy of the media product in the set of bins.

* * * * *